US008060926B1

(12) United States Patent
Ebrahimi et al.

(10) Patent No.: US 8,060,926 B1
(45) Date of Patent: Nov. 15, 2011

(54) TECHNIQUES FOR SECURELY MANAGING AND ACCELERATING DATA DELIVERY

(75) Inventors: Hashem Mohammad Ebrahimi, Salt Lake City, UT (US); Mark D. Ackerman, Eagle Mountain, UT (US); Mel J Oyler, Pleasant Grove, UT (US)

(73) Assignee: Novell, Inc., Provo, UT (US)

( * ) Notice: Subject to any disclaimer, the term of this patent is extended or adjusted under 35 U.S.C. 154(b) by 1476 days.

(21) Appl. No.: 10/784,440

(22) Filed: Feb. 23, 2004

Related U.S. Application Data

(60) Continuation-in-part of application No. 10/650,211, filed on Aug. 28, 2003, now Pat. No. 6,950,936, which is a continuation of application No. 09/493,506, filed on Jan. 28, 2000, now Pat. No. 6,640,302, which is a division of application No. 09/268,795, filed on Mar. 16, 1999, now Pat. No. 6,081,900.

(51) Int. Cl.
*G06F 9/00* (2006.01)
*H04L 29/06* (2006.01)

(52) U.S. Cl. .......................... 726/12; 713/153; 713/154

(58) Field of Classification Search .................. None
See application file for complete search history.

(56) References Cited

U.S. PATENT DOCUMENTS

| 5,550,984 | A | 8/1996 | Gelb ........................ 395/200.17 |
| 5,553,239 | A | 9/1996 | Heath et al. .............. 395/187.01 |
| 5,657,390 | A | 8/1997 | Elgamal et al. ................ 380/49 |
| 5,673,322 | A | 9/1997 | Pepe et al. ..................... 380/49 |
| 5,757,924 | A | 5/1998 | Friedman et al. ................ 380/49 |
| 5,768,271 | A | 6/1998 | Seld et al. ...................... 370/389 |
| 5,805,803 | A | 9/1998 | Birrell et al. .............. 395/187.01 |
| 5,825,890 | A | 10/1998 | Elgalmal et al. ................ 380/49 |
| 5,889,996 | A | 3/1999 | Adams |
| 5,913,025 | A | 6/1999 | Higley et al. ............. 395/187.01 |
| 5,963,915 | A | 10/1999 | Kirsch ............................ 705/26 |
| 5,991,810 | A | 11/1999 | Shapiro et al. ................ 709/229 |
| 6,003,084 | A | 12/1999 | Green et al. |
| 6,029,245 | A | 2/2000 | Scanlan ........................ 705/26 |
| 6,065,120 | A | 5/2000 | Laursen et al. |
| 6,112,228 | A | 8/2000 | Earl et al. ...................... 709/205 |

(Continued)

FOREIGN PATENT DOCUMENTS
WO    WO-02102020 A1    12/2002

OTHER PUBLICATIONS

"A New Management and Security Architechture for Extranets", http://www.aventail.com/index.phtml/solutions/white_papers/aec_wp.phtml, (1196-1999), 1-14.

(Continued)

*Primary Examiner* — Kaveh Abrishamkar
(74) *Attorney, Agent, or Firm* — Schwegman, Lundberg & Woessner, P.A.

(57) ABSTRACT

Techniques are provided for securely managing and accelerating the delivery of data associated with remote sites. A client desires to establish secure communications with a remote site. Requests made from the client to the remote site are intercepted or forwarded to a proxy, which locates a local managing service associated with handling the requests. The local managing service acts as an intermediary between the client and the remote site and communicates securely with the client. Data associated with the client's requests is at least partially cached by the local managing service for purposes of accelerating the delivery of that data to the client.

24 Claims, 3 Drawing Sheets

U.S. PATENT DOCUMENTS

| | | | |
|---|---|---|---|
| 6,128,644 | A | 10/2000 | Nozaki |
| 6,148,405 | A | 11/2000 | Liao et al. |
| 6,192,477 | B1 | 2/2001 | Corthell .................. 713/201 |
| 6,199,165 | B1 | 3/2001 | Grunner .................. 713/201 |
| 6,233,577 | B1 | 5/2001 | Ramasubramani et al. |
| 6,233,608 | B1 | 5/2001 | Laursen et al. |
| 6,263,437 | B1 | 7/2001 | Liao et al. |
| 6,434,687 | B1 | 8/2002 | Huppenthal |
| 6,513,061 | B1 * | 1/2003 | Ebata et al. .................. 709/203 |
| 6,584,567 | B1 * | 6/2003 | Bellwood et al. ............ 713/171 |
| 6,640,302 | B1 | 10/2003 | Subramaniam et al. |
| 6,643,701 | B1 * | 11/2003 | Aziz et al. .................... 709/227 |
| 6,665,721 | B1 | 12/2003 | Hind et al. .................... 709/227 |
| 6,732,269 | B1 | 5/2004 | Baskey et al. |
| 6,745,229 | B1 | 6/2004 | Gobin et al. |
| 6,950,936 | B2 | 9/2005 | Subramaniam et al. |
| 7,093,121 | B2 * | 8/2006 | Barton et al. .................. 713/150 |
| 7,137,143 | B2 * | 11/2006 | Chawla et al. .................. 726/12 |
| 7,430,757 | B1 | 9/2008 | Chari et al. |
| 7,552,223 | B1 | 6/2009 | Ackaouy et al. |
| 7,904,951 | B1 | 3/2011 | Ebrahimi et al. |
| 2002/0056033 | A1 | 5/2002 | Huppenthal |
| 2002/0199098 | A1 | 12/2002 | Davis |
| 2003/0167403 | A1 | 9/2003 | Mccurley et al. |
| 2004/0015725 | A1 * | 1/2004 | Boneh et al. .................. 713/201 |

OTHER PUBLICATIONS

"CMS Proxy Server—White Paper". http://csm.alcyonis.fr/proxies.htm, (1995-1998),1-13.

"CSM Proxy Server, the Ultimate Gateway to the Internetl ", http://www.csm-usa.com/white/gateway.htm, no later than Aug. 4, 1998, 1-5.

"How the Proxy Works", http://gopher.texshare.utexas.edu/Current/AccessMeet/accessproxy/how.html, (Jul. 22, 1998),1-2.

"Info needed to write proxy", http://www.netsys.com/firewalls-9604/0406.html, (Apr. 11, 1996), 1.

"Microsoft Proxy Server", http://www/microsoft.com/proxy/guide/whatsnew.asp?a=2&B=1, no later than Aug. 4, 1998,1-4.

"Microsoft Proxy Server Proxy vs. Border Manager", http://microsoft.com/proxy.comparisons/bulletin.asp?A=4&B=4, (1998), 1-8.

"NetSafteV3.0 The Firewall Solution from Siemens Nixdorf", http://www.swn.sni.be/NetSafe.htm, (May 31, 1997),1-3.

"Netscpe Proxy Server Administrator's Guide Version 3.5 for Unix", http://developer.netscape.com/docs/manuals/proxy/adminux//contents.htm, (1997).

"OWF Basics", http://www.omnigroup.com/MailArchive/OmniWeb-dev/Current/0002.html, (1997),1-2.

"r3 CypherClient", http://www.r3.ch/products/cypher/cypherclient.html, (1998),1-4.

"Submission: HTTPS v1.0 PAckage for OmniWeb 3x (Rhapsody)", http://www.plsys.co.uk.MailingLists/uk-next-announce.msg00251.html, (Jan. 24, 1998).

"Virtual Private Networking: An Overview" Microsoft http://www.microsoft.com/workshop/sever/feature/vpnovw.asp, no later than Feb. 25, 1998.

"Webroute 1.3.0", htto://www-miaif.lip6.fr/willy/pub/webroute/v1.3/untared/CHANGES, (1997),1-2.

"WebSTAR Security Toolkit: Troubleshooting", http://www.stamine.com/support/qa/webstarssl/ssltroubleshoot.html, 1-2.

Elgamal, Taher , at al., "Securing Communications on the Intranet and Over the Internet", http://www.netscape.com/newsref/ref/128bit.html, Jul. 1996),1-12.

Feibel, Werner , "Novell's Complete Encyclopedia of Networking" San Jose, CA : Alameda, CA ; *Novell Press ; Sybex*, (1995),625-630.

Ferguson, Paul , et al., "What is a VPN?", *Ferguson & Hutson, Revision 1*, (Apr. 1998),1-22.

Schneider, Bruce , "Applied Cryptography Protocols, Algorithms, and Source Code in C", New York ; *Wiley*, (1994),436-437.

Tanenbaum, Andrew S., "Computer Networks", Upper Saddle River, N.J. : *Prentice Hall PTR, 3rd Edition*, (1996),28-29, 396-417, 601-621, and 681-695.

Zhong, Qun , et al., "Security Control for COTS Components", *Computer*, 31(6), (Jun. 1998),67-73.

Appeal, S. , "[SSL-Talk List FAQ] Secure Sockets Layer Discussion List FAQ v1.1.1", http://www.faqs.org/faqs/computer-security/ssl-talk-faq/, (Nov. 16, 1998),22 pgs.

Cohen, E. , et al., "Improving End-to-End Performance of the Web Using Server Volumes and Proxy Filters", *Proceedings of the ACM SIGCOMM, Conference on Applications, Technologies, architectures, and protocols for computer communication*,28(4), (1998),12 pgs.

Dierks, T. , "Modifications to the SSL protocol for TLS <draft-ieft-tis-ssl-mods-00.txt>", http://www3.tools.ietf.org/html/draft-ietf-tls-ssl-mods-00, (Nov. 26, 1996),4 pgs.

Dierks, T. , et al., "RFC2246: The TLS Protocol Version 1.0", *The Internet Society*, Network Working Group,(1999),1-80.

Elgamal, T. , "The Secure Sockets Layer Protocol (SSL)", http://www3.ietf.org/proceedings/95apr/sec/cat.elgamal.slides.html, (Apr. 1995), 4 pgs.

Loutonen, A. , "Tunneling TCP based protocols through Web proxy servers", http://tools.ietf.org/id/draft-loutonen-web-proxy-tunneling-01.txt, (Aug. 1998),9 pgs.

Rabinovich, M., et al., "Chapter 7 & Chapter 8", Web Caching and Replication, Addison-Wesley Longman Publishing Co., Inc. Boston, MA, USA, (2001), 60-92.

\* cited by examiner

TECHNIQUES FOR SECURELY MANAGING AND ACCELERATING DATA DELIVERY

The present invention is a continuation-in-part to and commonly assigned U.S. application Ser. No. 10/650,211 filed on Aug. 28, 2003, now issued as U.S. Pat. No. 6,950,936, entitled: "Secure Intranet Access," the disclosure of which is incorporated by reference herein. U.S. application Ser. No. 10/650,211 is a continuation of Ser. No. 09/493,506, filed Jan. 28, 2000 now issued U.S. Pat. No. 6,640,302. Furthermore, U.S. Pat. No. 6,640,302 is a divisional of Ser. No. 09/268,795, filed Mar. 16, 1999 now issued U.S. Pat. No. 6,081,900.

FIELD OF THE INVENTION

The invention relates generally to network security, and more specifically to techniques for securely managing and accelerating the delivery of data over a network.

BACKGROUND OF THE INVENTION

It has become commonplace in today's networked environments to deploy devices or services known as proxies which act as intermediaries between interactions associated with clients and other external sites or services. Generally, a proxy separates a client from resources which are located externally or remotely from the client's local networking environment. In other scenarios, a proxy acts as a front-in manager for a remote service. Proxy services can also be associated with firewalls and gateways.

There are three types of proxies. A forward proxy is a service that the client is specifically configured to interact with. That is, with a forward proxy the client knows the identity of the forward proxy or the port over which the forward proxy is to be communicated with. A transparent proxy is a service which the client is not aware of; rather, communications originating from the client and coming into the client are routed to the transparent proxy for processing on behalf of the unknowing client. Routing to a transparent proxy can be achieved with a number of other devices, such as network switches, hubs, bridges, routers, etc. Another type of proxy is a reverse proxy; a reverse proxy resides externally to a client's local networking environment and presents itself to the client as if it is a particular origin server or service. A reverse proxy is useful for managing security of an origin service and for performing load balancing on behalf of an origin service.

Typically, clients interact, either directly or indirectly, with a proxy using secure communication protocols or insecure communication protocols. One popular secure communication protocol used by clients, which are World-Wide Web (WWW) browsers, is Hyper Text Transfer Protocol (HTTP) over Secure Sockets Layer (SSL) (referred to as HTTPS), or Transport Layer Security (TLS). The most popular insecure communication protocol used with the WWW is simply HTTP. Secure communications and insecure communications are associated with different defined communication ports of a communication device. For example, HTTP generally occurs over port 80, whereas HTTPS generally occurs over port 443. Moreover, secure communications are often encrypted and conventionally used for creating a secure communication tunnel between the parties engaging in secure communications.

Conventionally, managing secure communications between a client and an origin service is straightforward. A client knowingly or unknowingly uses a forward (knowingly) or transparent (unknowingly) proxy service to establish a secure communication tunnel using encrypted communications over a defined port to interact with a desired origin service, which resides externally to the client's local networked environment. The problem with conventional approaches is that there is no secure and practical way to accelerate and more efficiently deliver data associated with the desired origin service to the requesting client. This is because conventional proxy services are not capable of locally caching data received from a remote origin service when secure communications are being used, because of traditional communication tunnels which are used for conventional secure communications.

Thus, improved techniques for managing and accelerating the deliver of data associated with remote sites are needed.

SUMMARY OF THE INVENTION

In various embodiments of the invention, techniques are presented for managing and accelerating delivery of data over a network between clients and remote sites, which are external to the local networking environments of the clients. A client knowingly or unknowingly accesses a proxy for purposes of establishing secure communications with a remote site. The proxy identifies the desired remote site and passes the request along to a local managing service associated with that proxy for handling data interactions between the client and remote site.

The local managing service communicates securely with the requesting client as if it is the remote site; however, the local managing service vends data on behalf of the remote site within the local networking environment of the client. That is, the local managing service is capable of locally caching data and locally servicing subsequent requests for that data which are subsequently made by the client. In this way, the local managing service accelerates the delivery of the remote site's data and still communicates securely with the client in manners typically expected by the client.

DETAILED DESCRIPTION OF THE INVENTION

Figure 1:
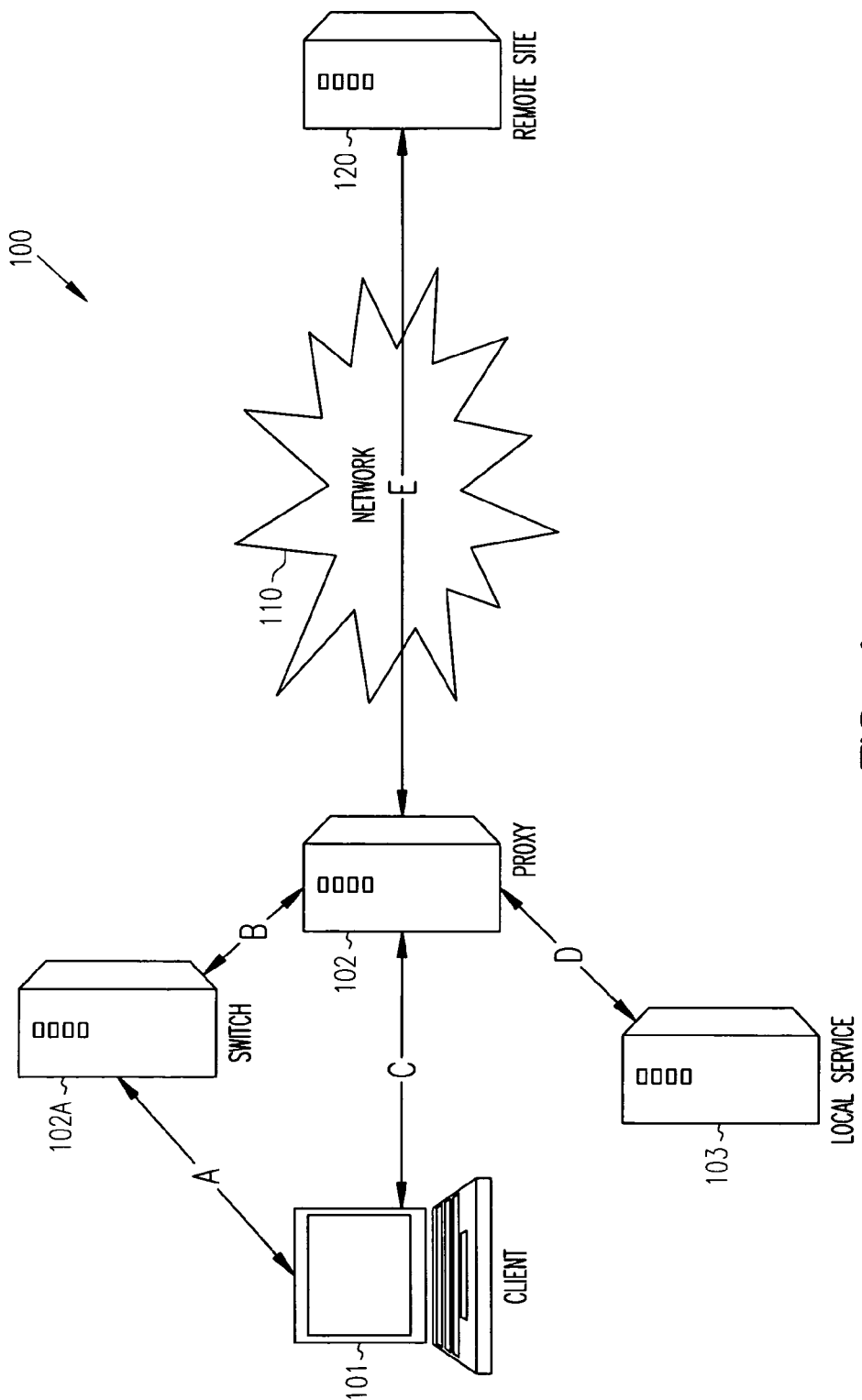
FIG. 1 is a diagram representing an architectural layout for a data management and acceleration delivery system.

As used herein and below a "client" is an electronic application, service, or system which may be automated or may be manually interacted with by an end-user. Similarly, a proxy is a device, service, or system which acts as an intermediary on behalf of clients as the clients interact with external (remote) sites. A proxy can be a forward proxy, which means the clients are configured to known about the proxy and configured to directly interact with the proxy. A proxy can also be transparent, which means the clients are not preconfigured to interact with the proxy, but some other service or device (e.g., router, hub, bridge, switch, etc.) detects communications going to or originating from the clients and directs them to the transparent proxy. A remote site is a service, application, system, or resource with which the client desires to interact with in a secure manner for purposes of acquiring data or information from that remote site.

The phrases "local networking environment" and "external (remote) networking environment are presented herein and below. Local networking environment refers to physical or logical network devices and services which are configured to be local to the clients and which interface with the clients. This does not mean that any particular local networking environment of a particular client physically resides in the same geographic location of the client or proximately resides within the same geographic location of the client, although in some embodiments this can be the case. Local networking environments can be dispersed geographically from the physical location of the client and form a logical local networking environment of the client. An external networking environment is a network which is not considered local to the client. A remote site is associated with external or remote networking environments, these external or remote networking environments are considered external and remote vis-á-vis a client's local networking environment.

Secure communications refer to communications that require specific secure protocols (e.g., HTTPS, SSL/TLS, etc.), which are communicated over predefined ports (e.g., 443, etc.) associated with communication devices. In many cases data communication using secure communications requires encryption. In some instances this encryption uses Public and Private Key Infrastructure (PKI) techniques and which may also use digital certificates and digital signatures. Insecure communications refer to communications that use insecure protocols (e.g. HTTP, etc.) and which use different defined ports (e.g., 80, etc.) of communication devices from that which are used with secure communications.

Data acceleration refers to the ability to cache data in advance of a need or request for that data. Any conventional caching services and managers can be used in the caching techniques presented herein and below with embodiments of this invention. Thus, by way of example, a cache manager can determine when to flush certain data from a cache and determine when certain data residing within the cache is stale and needs refreshed or updated. Generally, data is accelerated with caching techniques because the cache resides closer to a client and houses needed data in memory which is more quickly referenced and accessed. Thus, if a request for particular data can be satisfied from a local cache, a requesting client experiences a faster response time for that data and it appears to the client as if the data has been accelerated to satisfy a data request.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

FIG. 1 is a diagram representing one example architectural layout 100 for a data management and acceleration system. The architecture 100 is implemented within a distributed client-server architecture. The purpose of the architecture 100 is to demonstrate how various entities can be configured and arranged for interacting, managing, and accelerating the delivery of data over networks.

The architecture 100 includes a client 101, a proxy 102, optionally a switching device or logic 102A, and a local managing service 103. The client 101, the proxy 102, and the local managing service 103 are configured within a physical or logical local networking environment with respect to one another.

During operation of the architecture 100, a client 101 makes a request for data controlled by a remote site 120. The remote site resides in an external network environment with respect to the client 101 and is accessed over any network connection 110. The network connection can be hardwired, wireless, or a combination of hardwired and wireless. Either the client 101 desires secure communications, or the remote site 120 requires secure communications for purposes of acquiring the desired data which the client 101 seeks.

The proxy 102 sits between the client 101 and the desired network connection 110, which leads to the remote site 120 and the desired data. In one embodiment, the proxy 102 is a transparent proxy 102, such that the client 101 is not configured to directly know about the proxy 102 or to directly interface with the proxy when the client 101 makes a secure communications request for the desired data controlled by the remote site 120. In this embodiment, when the client 101 initially makes a request to the remote site 120 using secure communications via A, a switching logic or device 102A intercepts A and forwards A to the transparent proxy 102 via B. In other embodiments, the proxy 102 is a forward proxy 102, such that the client 101 is preconfigured to know that it must communicate with the proxy 102 when attempting to reach the remote site 120. In these embodiments, the client 101 directly makes a request for the remote site 120 via C to the forward proxy 102.

Conventionally, when a proxy receives a secure communication request for a remote site 120, the communications takes place using secure communication protocols over a predefined secure port accessible to the proxy and a communication tunnel is established between the client-proxy and proxy-remote site to satisfy the client's request. With the teachings of this invention, this can still occur if such an arrangement is desired; however, in addition to conventional techniques, the present invention configures the proxy 102 to detect the identity of the remote site 120 which the client is attempting to contact. That identity is then used to determine if a local managing service 103 is needed to mediate between the client 101 and the desired remote site 120.

The client 101 initially makes a secure communications request for data of the remote site via A or C (depending upon whether a transparent or forward proxy 102 is installed within the architecture 100). The proxy 102 receives the secure communications request via B or C, recognizes that a local managing service 103 is vending data on behalf of the remote site 120 and passes the request via D to the local managing service 103.

Thus, when the proxy 102 detects that a client 101 is attempting to establish secure communications with a remote site 120 that is associated with a particular local managing service 103, the proxy 102 passes the client 101 request for communication along to the particular local managing service 103. The local managing service 103 is trusted by the remote site 120, this means that the remote site 120 may house the identity of the local managing service 103 in one of its trusted data stores which identifies trusted parties. The remote site 120 also recognizes communications with the local managing service 103 as being secure. Similarly, the local managing service 103 recognizes and trusts the remote site 120. Thus, the remote site 120 delegates its authority to the local managing service 103 to vend some of its data on behalf of it within the local networking environment of the client 101.

One technique for doing this is to provide a digital certificate of the remote site 120 to the local managing service 103. Typically, the remote site 120 provides certificates to trusted parties for purposes of decrypting its data communications. The remote site 120 may also provide an encryption key to the local managing service 103. The encryption key is what the remote site 120 personally uses to encrypt its data communications for purposes of secure communications with a trusted party. Armed with the certificate and/or encryption key, the local managing service 103 can present itself to the client 101 within the client's local computing environment as if the local managing service 103 were in fact the remote site 120.

Once the proxy 102 and the local managing service 103 are properly configured within the client's local computing environment, data can be managed and accelerated by the local managing service 103 on behalf of the remote site 120 in the following manners. The local managing service 103 uses D to interact with the proxy 102 and communicate with the remote site 120 via E. This communication can be via secure communications or if desired can be via insecure communications. If secure communications are desired, then the proxy 102 establishes a secure communications channel between the local managing service 103 and the remote site 120 via the proxy 102.

In addition, the proxy 102 creates a secure communications tunnel between the local managing service 103 and the client 101. Moreover, the proxy 102 creates a secure communications channel between the local managing service 103 and the remote site 120. When the client 101 requests data of the remote site 120 via C (or indirectly via C through A and B), where C is a secure communications tunnel to the local managing service 103 via D through the proxy 102, the local managing service 103 inspects its existing cache for data that will satisfy the request of the client 101. If the data is available in the cache, then it is accelerated and delivered from the local managing service 103 to the client 101 via secure communications through the proxy 102 using D and C. If the data requested by the client 101 is not available from cache, then the local managing service 103 via a secure communication channel (for a secure remote site 120) goes through the proxy using D and E and contacts the remote site 120 for the needed data, and when that data is acquired it is then delivered securely to the client 101 in the manners discussed above from the local managing service 103 to the client 101. In one embodiment, the local managing service 103 goes through the proxy using D and E and contacts the remote site 120 for the needed data using an insecure communications channel (for an insecure remote site 120). In this latter embodiment, the local managing service 103 and the remote site 120 may still engage in secure communications over the insecure communication channel using a mutually agreed upon encryption and/or protocol between one another.

Basically, the local managing service 103 becomes in a sense a secure reverse proxy for the remote site 120, where that secure reverse proxy is within the local computing environment of the client 101. The remote site 120 delegates its data vending operations to the local managing service 103 for distribution to the client 101. The client 101 believes that it is directly communicating with the remote site 120 with secure communications, although the client 101 is actually communicating securely with the local managing service 103.

The architecture 100 of FIG. 1 can be achieved with minimal changes to existing networking architectures. Basically, existing proxies are configured to inspect secure communication requests to identify the target remote site. If the target site is associated with a local managing service 103, then the request for secure communications is passed from the proxy 102 to the identified local managing service 103. The local managing service 103 translates and manages secure communications or insecure communications received from the remote site into secure communications expected by the client 101.

One technique for translating between insecure and secure communications, which can be used by local managing services 103 of the invention, is described in U.S. Pat. Nos. 6,081,900 and 6,640,302 and co-pending U.S. application Ser. No. 10/650,211, all of which are entitles "Secure Intranet Access," all of which are commonly assigned to Novell, Inc., of Provo, Utah, and all disclosures of which are incorporated by reference herein.

Applications of the architecture 100 can provide a variety of benefits to service or content providers (remote sites 120) by permitting them to delegate data vending to locally situated local managing services 103. This improves data delivery throughput to clients 101 and alleviates remote sites 120 from processing loads which may become problematic when large amounts of data are being requested or when large numbers of transactions are being processed for data.

Figure 2:
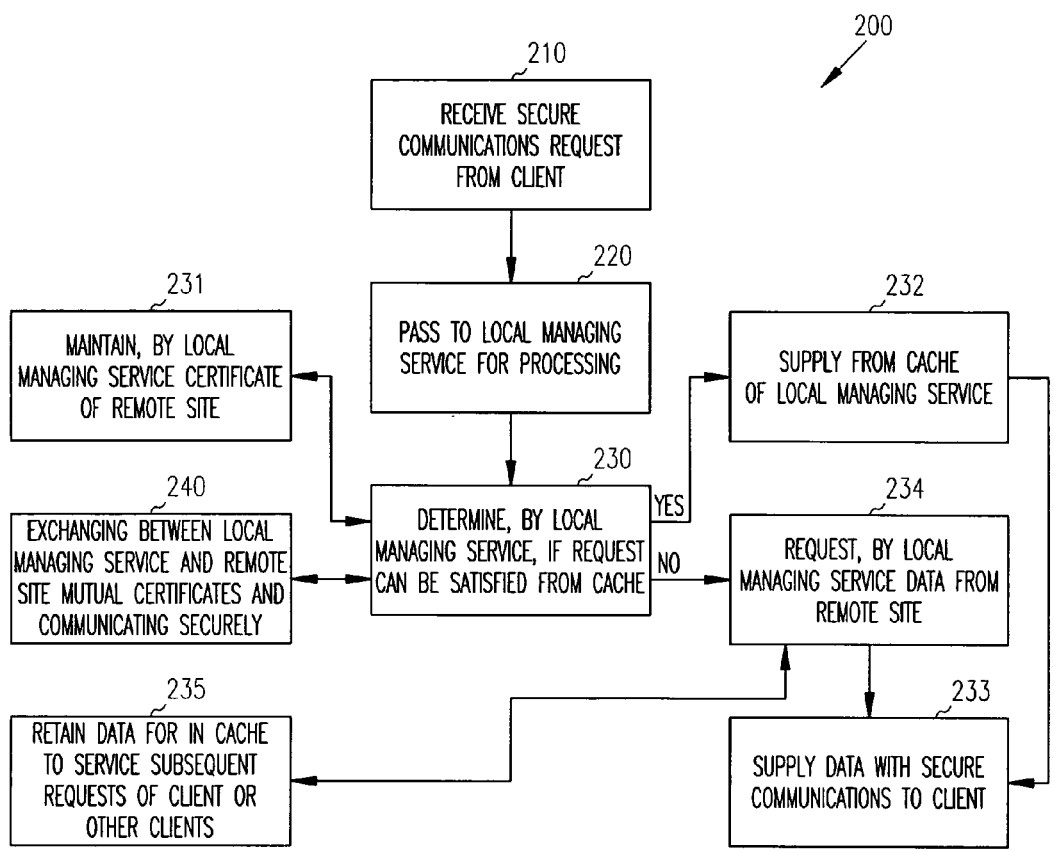
FIG. 2 is a flowchart representing a method for managing and accelerating the delivery of data.

FIG. 2 is a flowchart of one method 200 for managing and accelerating the delivery of data over networks. The method 200 (hereinafter "processing") is implemented in a computer readable and accessible medium. In one embodiment, the processing represents services provided by a proxy 102 and a local managing service 103, such as the services and processing discussed above with respect to the architecture 100 of FIG. 1.

Initially, an architectural layout similar to the architecture 100 of FIG. 1 is configured and arranged. This sets up a local networking environment for a client when a local service is in a position to locally vend data securely to the client on behalf of a remote site. That data is vended to the client securely.

Accordingly, at 210, a secure communications request for data associated with a remote site is received by the processing. The request originates from a client who desires some data or information from a remote site residing in an external networking environment with respect to the client's local networking environment. The client anticipates or expects to receive the desired data or information via secure communications (e.g., HTTPS, SSL/TLS, etc.).

In some embodiments, the processing directly receives the secure communications request from the client. This occurs when the processing is configured as a forward proxy to the client within the client's local computing environment. In still other embodiments, the processing receives the secure communications request indirectly from the client and directly from a switching logic or router. This occurs when the processing is configured as a transparent proxy within the client's local computing environment.

Conventionally, when a secure communications request was received at conventional proxies, a secure communications tunnel would be established between the proxy and the desired remote site and between the client and the proxy to facilitated communications between the client and the desired remote site. With embodiments of this invention, this processing is altered by the processing in the following manner.

The processing determines the identity of the desired remote site and looks up that identity in a list, table, memory, and/or storage to find the identity of a specific needed local service which is designated as a data vendor for that particular remote site. Once the needed local service is identified with the lookup operation, the processing, at 220, passes, forwards, or transmits the initial received secure communications request to the local service.

The local service has been previously configured to logically act as a secure reverse proxy on behalf of the remote site, but innovatively from within the local computing environment of the requesting client. Thus, the local service may, at 231, maintain one or more digital certificates associated with the remote service; may maintain an encryption key used by the remote service to encrypt data associated with secure communications, etc.

The local service requests that the processing establish a secure communications tunnel between it and the client. Next, the local service inspects the initial secure communications request and determines if data or information associated with that request can be satisfied from the local service's existing cache at 230. If that request can be satisfied from the existing contents of the cache, then at 232 that data is supplied from the cache and delivered via the secure communications tunnel using secure communications to the client at 233. In some situations and embodiments, the remote service or the type of data associated with a request may not be permitted to be cached based on prior arrangements and configurations between the local service and the remote site, in these situations the local service directly acquires the needed data from the remote site on behalf of the client to satisfy the client's initial issued request.

If the local service determines at 230 that the needed data or information associated with the client's initial request does not exist in the contents of the cache, then, at 234, the local service requests the needed data or information directly from the remote site on behalf of the client. Once the needed data is acquired, it is securely supplied via the prior established secure communications tunnel between the processing and the client to the client at 233 and, if the data is of a type that is permitted to be cached, the data is retained in the cache of the local service at 235.

Communication between the local service and the remote site can occur in a variety of manners. For example, in one embodiment, at 240, the local service and the remote site can be in a mutual trust relationship such that each of the two entities exchanges digital certificates with one another, and optionally, digitally sign all communications transacting between one another. In other embodiments, the local service and remote site communicate with one another using insecure communication channels. In this embodiment, some form of data encryption or agreed upon protocol can be mutually used between the two entities during transactions occurring over the insecure communication channels in order to provide some desired level of security.

The processing of FIG. 2 demonstrates how a proxy can be configured and processed within a local networking environment of a client for purposes of interfacing and establishing a secure reverse proxy (local service) for a remote site. The local service manages and accelerates data delivery from the remote service to the client. Conventionally, this has not been achievable within the local networking environments of clients.

Figure 3:
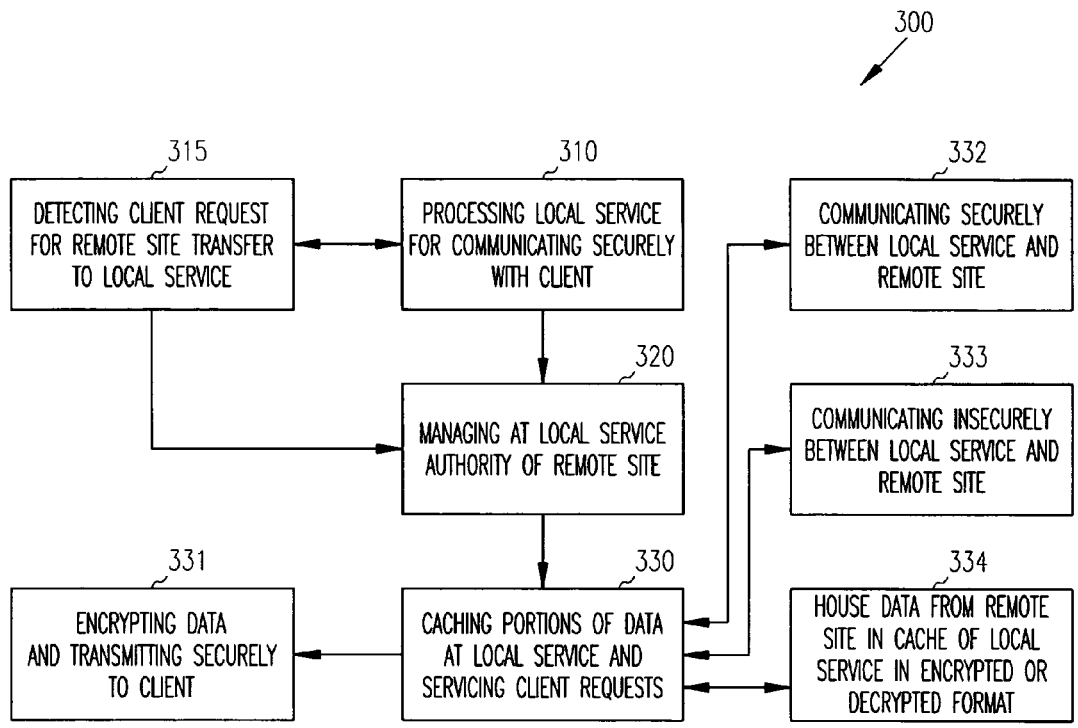
FIG. 3 is a flowchart representing another method for managing and accelerating the delivery of data.

FIG. 3 is a flowchart of another method 300 for managing and accelerating the delivery of data over networks. The method 300 (hereinafter "processing") is implemented in a computer readable and accessible medium within the local networking environment of a client, where the client, and/or a needed remote site, desire to interact securely with one another. In one embodiment, the processing reflects the services or operations which are performed by a proxy 102 and a local managing service 103 associated with the architecture 100 of FIG. 1.

At 310, a local service is initiated or processed for purposes of communicating securely with a requesting client (via a secure communications tunnel) and for purposes of communicating securely with a remote site (via a secure communications channel) on behalf of that client. Once initiated, at 320, the local service manages authority, data management, and data delivery on behalf of a particular remote site and the local service presents itself to the client as if it were in fact the particular remote site (similar to a reverse proxy arrangement between the local service and the remote site). During operation, the processing detects at 315 when a client makes a request for the particular remote site and transfers any such requests directly to the local service.

In advance of any initially received request from the client, the local service may (based on predefined configuration settings) acquire portions of data associated with the remote site and house that data in a cache, which is accessible to the local service. The cache and cache management can be managed by the processing and provided to the local service via the processing. Any conventional or custom-developed caching services or techniques can be deployed with the embodiments of this invention.

As a particular client makes requests to a remote site for data, the local service caches and pre-acquires that data for purposes of populating the local cache at 330. This allows the local service to accelerate delivery of data to the client and still use conventional secure communications which the client expects over traditional secure communications tunnels, which are established and maintained through the processing. Thus, at 331, the local service delivers the data to the client from the cache along with the remote site's certificate, which essentially identifies the local service as the remote site to the client. The client has a digital certificate associated with the remote site which validates that the received data is legitimate. In some embodiments, the local service may act as an authentication service for the remote site, such that the local service ensures that the client is properly authenticated to accessing the remote site before any such digital certificate of the remote site is vended to the client. In other arrangements, the remote site trusts the local service and permits any clients within the local computing environment of the local service to be authenticated and given access to the data and certificate of the remote site through the local service.

The local service is configured for interacting via a secure communications channel and for communicating securely with the remote site through the processing, as depicted at 332. Secure communications can also be mutual, such that both the local service and the remote site exchange certificates, and optionally mutually sign all communications transacting between the two.

The local service can elect to natively store or house the data received from the remote site, which it is accelerating to the client, in encrypted or decrypted formats, as depicted at 334. When the data is natively stored in decrypted format, the local service uses session keys established during an SSL session between the local service and the client to encrypt the data retrieved from the cache and to vend that encrypted data to the client. The local service uses a certificate which represents the identity of the remote site (a different certificate with a different private key but represents the identity of the remote site, i.e., the certificate has the same subject name as the remote site.)

To keep the data in encrypted format, the received encrypted data from the remote site must be decrypted using the session key established between the remote site and the local service and re-encrypt using a different local storage key. To vend the encrypted data from the local service cache to the client, the data is decrypted using the local storage key and encrypted using the SSL session key established between the local service and the client.

The remote site certificate can be signed using an internal Certificate Authority (CA) and by providing the trusted root of the internal CA to the local service, the established secure channel between the local service and the remote site is more secure, since no other authority could have signed the certificate sent by the remote site during the SSL handshake.

The processing of FIG. 3 demonstrates how a proxy (processing) and its local services can interact for purposes of establishing a local data management and acceleration technique on behalf of clients and remote sites. Essentially, the clients believe they are interacting securely with desired remote sites, and the remote sites delegate authority to manage and deliver their data to the local services residing in the local networking environments of the clients. This maintains traditional delivery of data via traditional secure communication tunnels, but permits data to be distributed and accelerated locally which has not been conventionally achievable with exiting techniques. Thus, clients experience faster and improved throughput with data delivery and remote sites experience reduced processing load and potentially a reduction in required bandwidth, since data delivery and management are delegated to local service.

Figure 4:
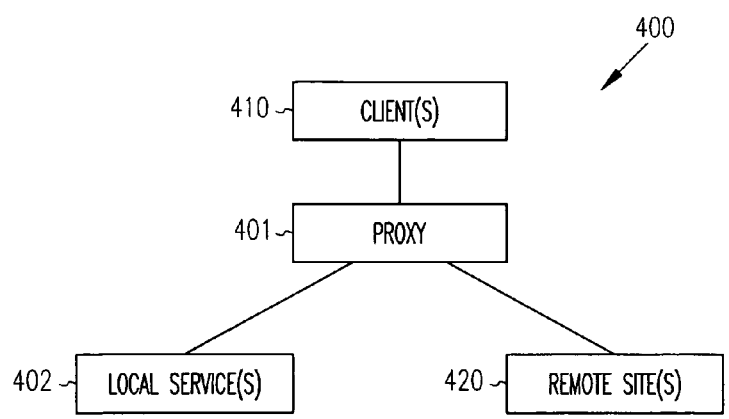
FIG. 4 is a diagram representing a data management and acceleration delivery system.

FIG. 4 is a diagram of a data management and acceleration delivery system 400. The data management and acceleration delivery system 400 is implemented in a computer readable and accessible medium and operates over one or more networks. The networks can be hardwired, wireless, or a combination of hardwired and wireless. In one embodiment, various processing aspects which were described above with respect to the methods 200 and 300 of FIGS. 2 and 3, respectively, are implemented within the data management and acceleration delivery system 400.

The data management and acceleration delivery system 400 minimally includes a proxy 401 and one or more local services 402 associated with the proxy 401. The proxy 401 can be a transparent proxy or a forward proxy. Moreover, in some embodiments, the proxy can be a transparent proxy for some clients 410 and a forward proxy for other clients 410. The proxy 401, the clients 410, and the local services 402 are all configured to be within a local networking environment with one another. Conversely, the remote sites 420 are in an external networking environment with respect to the local networking environment of the proxy 401, the clients 410, and the local services 402.

The proxy 401 includes cache and caching services which can be used and accessed by the local services 402. In addition, the proxy 401 maintains in memory, storage, and/or data structures a mapping between the identities of remote sites 420 and identities of local services 402. The mapping permits the proxy 401 to identify a particular local service 402 which is logically acting as a secure reverse proxy on behalf of a particular one of the remote sites 420.

The local services 402 vend data and certificates on behalf of their corresponding remote sites 420 to the clients 410 via secure communications (e.g., HTTPS, SSL/TLS, etc.). This may mean that the local services 402 maintain certificates associated with their respective remote sites 420, maintain certificates with respect to the clients 410 that they service, and maintain one or more encryption keys associated with the remote sites 420, clients 410, or their own independent encryption keys.

The local services 402 communicate securely over secure communications tunnels with their respective clients 410 via the proxy 401. The local services 402 may likewise communicate securely over secure communication channels with their respective remote sites 420 via the proxy 401.

The clients 410 believe that they are interacting with desired remote sites 420 via secure communications to acquire specific desired data; however, with the teachings of this invention the clients 410 are actually interacting with specific local services 402 that are delegated with the task of managing and delivering data on behalf of the specifically desired remote sites 420. The local services 402 uses caching techniques and services provided by the proxy 401 to cache and accelerate delivery of desired data to the clients 410 from the cache. It is the local services 402 that directly interact with the remote sites 420. It should also be noted, that not all types of data or relationships between clients 410 and remote sites 420 may permit caching of data. For example, stock data, personal data, or financial data may not be identified as being permissibly cached by the local services 402. Thus, data types and relationships can be selectively identified as being managed and cached by local services 402. Additionally, the data management and acceleration delivery system 400 does not preclude clients 410 and remote sites 420 that continue to maintain relationships in traditional fashions. That is the proxy 401 will establish a traditional secure communication channel for identified remote sites 420 which do not have corresponding local services 402 which are acting as a local secure reverse proxies on behalf of the remote sites 420.

The data management and acceleration delivery system 400 demonstrates how a proxy 401 can be configured, processed, and interfaced with local services 402 to handle traditional secure communications on behalf of interactions occurring between clients 410 and remote sites 420. The local services 402 act as secure reverse proxies for the remote sites, but are within the local computing environments of the clients 410. This permits the local services 402 to accelerate data delivery from the remote sites 420 to the clients 410 and relieves the remote sites 420 of data management responsibility and processing associated with individually requesting clients 410. Conventionally, such a scenario was only available to clients that desired to interact over insecure communication channels with remote sites. With the teachings of this invention, this benefit is also now realized by clients 410 which desire to interact with remote sites 420 over secure communication channels.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for managing and accelerating the delivery of data implemented in a computer-readable storage medium and processed on a proxy device for performing the method, comprising:

receiving a secure communications request for data associated with a remote site, wherein the request is received from a client and the secure communications request occurs via Secure Socket Layer (SSL) communications with the client and wherein the request is received at a forward proxy that processes within a local networking environment of the client, the local networking environment within a same physical and geographical location for the client and the forward proxy;

determining that a local managing service is needed to mediate between the client and the remote site based on an identity for the remote site, the remote site associated with an external networking environment, the external networking environment existing in a different physical and geographical location from that of the client and the forward proxy;

processing the local managing service from within the local networking environment of the client;

passing the request to the local managing service for processing acting as the forward proxy for the client, the local managing service is capable of caching the data for servicing the secure communications request of the client within the local networking environment of the client and capable of securely interfacing with the remote site via the external networking environment, the local managing service houses the identity for the remote site and local managing service is trusted by the remote site and the remote site delegates authority to the local managing service to vend data of the remote site within the local networking environment of the client;

creating, by the proxy device, a secure communications tunnel between the client and the local managing service; and creating, by the proxy device, another secure communications tunnel between the local managing service and the remote site, the local managing service also acts as a reverse proxy on behalf of the remote site from within the local networking environment of the client, the remote site delegates data vending on behalf of the remote site to be managed and distributed by the local managing service from within the local networking environment of the client and the local managing service presents itself to the client as the remote site appearing to originate from the external networking environment.

2. The method of claim 1 further comprising:

determining, by the local managing service, when the secure communications request can be satisfied with cached data; and supplying the data from the cached data to the client with secure communications, when present in cache.

3. The method of claim 2 further comprising:

requesting, by the local managing service, the data from the remote site if the data is not in the cache;

receiving the data from the remote site; and supplying the data to the client with secure communications.

4. The method of claim 3 further comprising, housing the data in the cache for subsequent requests made by the client or other clients for the data, when the data is permitted to be cached.

5. The method of claim 1 further comprising, maintaining, by the local managing service, a certificate associated with communications from the remote site.

6. The method of claim 1 further comprising:

transmitting, by the local managing service, to the remote site a first certificate associated with the identity of the local managing service;

receiving, from the remote site, at the local managing service a second certificate associated with the identity of the remote site; and communicating between the remote site and the local managing service with Secure Sockets Layer (SSL) communications using the first and second certificates.

7. A method of managing and accelerating delivery of data implemented in a computer-readable storage medium and to process within a local networking environment of a client for performing the method, comprising:

processing a local service of a proxy for communicating securely with the client and for acting on behalf of the client during interactions between the client and a remote site, the local service processed based on an identity of the remote site that identity used to determine that the local service is needed to mediate between the client and the remote site, the local service processes from within a local networking environment of the client and uses Secure Socket Layer (SSL) communications when interacting with the client, the local networking environment within a same physical and geographical location as the client, and the local service presents itself to the client as the remote site appearing from an external networking environment, the external networking environment existing within a different physical and geographical location from that which is associated with the client and the local service, and the local service acts as a reverse proxy on behalf of the remote site from the local networking environment of the client, the remote site delegates data vending from the remote site to the local service for distributing to the client;

managing authority from the remote site at the local service, wherein authority is managed by accessing a certificate of the remote site at the local service and within the local networking environment of the client;

establishing a secure tunnel between the local service of the proxy and the client for interactions between the client and the local service;

establishing another secure tunnel between the local service and the remote site for interactions between the local service and the remote site; and caching, within the local service, data received from the remote site, and portions of the data are sent to the client in order to service data requests made from the client to the remote site.

8. The method of claim 7 further comprising:

initially transmitting a local service certificate to the remote site; and subsequently communicating securely between the local service and the remote site using the local service certificate and the certificate of the remote site.

9. The method of claim 7 further comprising, establishing the proxy as a transparent proxy for the client.

10. The method of claim 7 further comprising:
inspecting at the proxy a secure request made from the client for the remote site; and
transferring the secure request to the local service for processing.

11. The method of claim 7 wherein caching further includes housing the data in a decrypted format within cache of the local service.

12. The method of claim 7 wherein caching further includes sending the portions of the data from the cache to the client along with the certificate associated with the remote site.

13. A data management and acceleration delivery system implemented in computer-readable storage media and to process on devices of a network, the system comprising:
a proxy;
a local service accessible to the proxy; and
a remote site external to the proxy, the proxy directs secure requests received from a client for the remote site to the local service, the secure requests are directed to the local service based on an identity for the remote site that is used to determine that the local service is needed to mediate between the client and the remote site, the local service: acts as a transparent proxy on behalf of the client, processes within a local networking environment of the client, and communicates securely with the client using Secure Socket Layer (SSL) communications via a first secure tunnel established by the proxy for interactions between the local service and the client, the local computing environment within a same physical and geographical location as the client, and the local service interacts securely with the remote site via a second secure tunnel established by the proxy for interactions between the local service and the remote site, communication with the remote site occurring over an external networking environment that is at a different physical and geographical location from that which is associated with the client and the local service, the interactions between the local service and the remote site is to acquire data on behalf of the client, the local service also configured for acting as a reverse proxy on behalf of the remote site and from within the local networking environment of the client, the remote site delegates data vending to the local service for distribution to the client and the local service presents itself to the client as the remote site, and portions or all of the acquired data are cached within the local service and used to service requests made by the client from within the local networking environment of the client.

14. The data management and acceleration delivery system of claim 13 wherein the local service includes a certificate with the identity of the remote site which is vended to the client.

15. The data management and acceleration delivery system of claim 13 wherein the local service and remote site mutually interact securely with one another by exchanging certificates with one another.

16. The data management and acceleration delivery system of claim 15 wherein the local service and the remote site sign communications occurring between them.

17. The data management and acceleration delivery system of claim 13 wherein the client is a browser application.

18. The data management and acceleration delivery system of claim 17 wherein the browser is configured to contact the proxy when making requests directed to the remote site.

19. The data management and acceleration delivery system of claim 17 wherein the proxy intercepts requests made from the browser which are directed to the remote site and forwards the requests to the local service for handling the requests.

20. A data management and acceleration delivery system implemented in a computer-readable storage medium and to process on one or more devices of a network, the system comprising:
a proxy; and
one or more local services directly accessible to the proxy, the proxy acts as an intermediary between one or more clients and one or more remote sites, the proxy detects attempts made by the clients for establishing secure communications with the remote sites and based on the identities of a particular client and particular remote site identifies a particular local service and determines based on a particular identity for the particular remote site that the particular local service is needed to mediate between the particular remote site and the particular client, the particular local service: communicates securely with the particular client via Secure Socket Layer (SSL) communications as a transparent proxy to the particular client and via a first tunnel established by the proxy between the particular local service and the particular client, the particular local service processes within a local networking environment of the particular client and within a same physical and geographical location as that of the particular client, and the particular local service also securely communicates with the particular remote site as a reverse proxy for the particular remote service via a second tunnel established by the proxy between the particular local service and the particular remote site, communication with the particular remote site occurring over a particular external networking environment that is at a different physical and geographical location from that which is associated with the particular client and the particular local service, and the particular local service acts as the reverse proxy for the particular remote service from within the local networking environment of the particular client, and the particular remote site delegates data vending to the particular local service for distribution to the particular client and the particular local service presents itself to the particular client as the particular remote site from within the local networking environment of the particular client and the particular local service caches data received from the particular remote site for purposes of servicing requests for portions of that data requested by the particular client and the cached data resides within the local networking environment of the particular client.

21. The data management and acceleration delivery system of claim 20 wherein each local service is associated with a unique one of the remote sites.

22. The data management and acceleration delivery system of claim 20 further comprising switching logic that intercepts requests from the clients which are directed to the remote sites and forwards them to the proxy.

23. The data management and acceleration delivery system of claim 20 wherein each of the local services includes a certificate associated with a unique one of the remote sites.

24. The data management and acceleration delivery system of claim 20 wherein a number of the local services communicates securely with a number of the remote sites by initially exchanging mutual certificates.

* * * * *